US012192733B2

(12) United States Patent
Von Tuerckheim et al.

(10) Patent No.: US 12,192,733 B2
(45) Date of Patent: Jan. 7, 2025

(54) METHOD FOR AUDIO PROCESSING

(71) Applicant: Harman Becker Automotive Systems GmbH, Karlsbad (DE)

(72) Inventors: Friedrich Von Tuerckheim, Hamburg (DE); Adrian Von Dem Knesebeck, Munich (DE)

(73) Assignee: Harman International Industries, Incorporated, Stamford, CT (US)

( * ) Notice: Subject to any disclaimer, the term of this patent is extended or adjusted under 35 U.S.C. 154(b) by 252 days.

(21) Appl. No.: 17/974,820

(22) Filed: Oct. 27, 2022

(65) Prior Publication Data

US 2023/0134271 A1 May 4, 2023

(30) Foreign Application Priority Data

Oct. 29, 2021 (EP) .................................... 21205599

(51) Int. Cl.
*H04S 5/00* (2006.01)
*H04R 5/04* (2006.01)
*H04S 7/00* (2006.01)

(52) U.S. Cl.
CPC ................. *H04S 5/00* (2013.01); *H04R 5/04* (2013.01); *H04S 7/303* (2013.01); *H04S 7/307* (2013.01);

(Continued)

(58) Field of Classification Search
CPC . H04S 5/00; H04S 7/303; H04S 7/307; H04S 2400/01; H04S 2420/01;

(Continued)

(56) References Cited

U.S. PATENT DOCUMENTS 5,812,674 A * 9/1998 Jot .......................... H04S 7/305 381/63
6,188,769 B1 * 2/2001 Jot ............................ H04S 3/00 381/63

(Continued)

FOREIGN PATENT DOCUMENTS

EP 3096539 A1 11/2016
EP 3699905 A1 8/2020
EP 3699906 A1 8/2020

OTHER PUBLICATIONS

Coleman, P. et al., "Object-Based Reverberation for Spatial Audio", Journal of the Audio Engineering Society, Feb. 16, 2017, 12 pgs., vol. 65, vol. 1/2.

(Continued)

*Primary Examiner* — Xu Mei
(74) *Attorney, Agent, or Firm* — Brooks Kushman P.C.

(57) ABSTRACT

A method for audio processing, the method comprising: determining at least one input audio object that includes an input audio object signal and an input audio object location, wherein the input audio object location includes a distance and a direction relative to a listener location; depending on the distance, applying a delay, a gain, and/or a spectral modification to the input audio object signal to produce a first dry signal; depending on the direction, panning the first dry signal to the locations of a plurality of speakers around the listener location to produce a second dry signal; depending on one or more predetermined room characteristics, generating an artificial reverberation signal from the input audio object signal; mixing the second dry signal and the artificial reverberation signal to produce a multichannel audio signal; and outputting each channel of the multichannel audio signal by one of the plurality of speakers.

20 Claims, 6 Drawing Sheets

(52) U.S. Cl.
CPC ...... *H04R 2499/13* (2013.01); *H04S 2400/01* (2013.01); *H04S 2420/01* (2013.01)

(58) Field of Classification Search
CPC . H04S 3/008; H04S 7/30; H04S 7/302; H04S 7/305; H04R 5/04; H04R 2499/13; G10K 15/12
USPC ...................................... 381/63; 84/630, 707
See application file for complete search history.

(56) References Cited

U.S. PATENT DOCUMENTS 8,670,850 B2 * 3/2014 Soulodre ................. H04S 7/301 381/63
9,107,019 B2 * 8/2015 Lee ......................... H04S 3/008
9,805,704 B1 * 10/2017 Abel ........................ G10H 5/02
10,559,295 B1 * 2/2020 Abel ........................ H04S 7/305
10,812,902 B1 * 10/2020 Abel ........................ H04R 3/02
11,109,179 B2 * 8/2021 Honma ................... H04S 7/305
11,133,017 B2 * 9/2021 Von Tuerckheim ......................... H03M 7/3059
11,670,319 B2 * 6/2023 Von Tuerckheim ......................... B60R 11/0217 704/200
2012/0275613 A1 * 11/2012 Soulodre ................. H04S 5/005 381/63
2019/0052992 A1 * 2/2019 MacLellan ............. H04S 7/305
2021/0377691 A1 * 12/2021 Honma ................... G10L 19/00

OTHER PUBLICATIONS

European Search Report dated Apr. 29, 2022 for European Patent Application No. 21205599.0, 6 pages.

* cited by examiner

METHOD FOR AUDIO PROCESSING

CROSS-REFERENCE TO RELATED APPLICATIONS

This application claims priority to European application Serial No. 21205599.0 filed Oct. 29, 2021, the disclosure of which is hereby incorporated in its entirety by reference herein.

TECHNICAL FIELD

The present disclosure relates to spatialized audio processing, in particular to rendering virtual sound sources. The present disclosure is applicable in multichannel audio systems, such as, vehicle sound systems.

BACKGROUND

Spatialized audio processing includes playing back sound, such as speech, warning sounds, and music, and by using a plurality of speakers, creating the impression that the sound comes from a certain direction and distance.

Known solutions suffer from a lack of precision, and thus require a large number of speakers to reach high accuracy. Moreover, as far as speakers are to be used rather than headphones, not the user, who is situated at a predetermined position, but also other people can hear the audio and may be distracted.

Therefore, there is a need for high-precision, selective spatialized audio processing.

SUMMARY

A first aspect of the present disclosure relates to a method for audio processing. The method comprises the following steps.

1. An input audio object is determined. The input audio object includes an input audio object signal and an input audio object location. The input audio object location includes a distance and a direction relative to a listener location.

2. One or more of the following modifications are applied to the input audio object signal depending on the distance: a delay, a gain, and/or a spectral modification. Thereby, a first dry signal is produced.

3. The first dry signal is panned, depending on the direction, to the locations of a plurality of speakers around the listener location. Thereby, a second dry signal is produced.

4. An artificial reverberation signal is generated from the input audio object signal. This generation step depends on one or more predetermined room characteristics.

5. The second dry signal and the artificial reverberation signal are mixed to produce a multichannel audio signal.

6. Each channel of the multichannel audio signal is output by one of the plurality of speakers.

The input audio object signal is processed in two ways in parallel: In steps 2 and 3 above, a multichannel dry signal is created by distance simulation and amplitude panning. The dry signal is understood to be a signal in which no reverberation is added. In step 4, a reverberation signal is created. These two signals are then mixed and output via speakers in steps 5 and 6, respectively.

Execution of the method thereby permits rendering and playing the input audio object signal such that a listener, located at the listener position, is able to hear the sound and have the appearance that the sound is coming from the input audio object location. Applying a distance-dependent delay on the input audio object signal in step 2 allows adjusting the relative timing of reverberation and dry signals to the delay observed in a simulated room having the predetermined room characteristics. The reverberation is controlled by applying one or more parameters. Parameters may be, for example, the time and level of the early reflections, the level of the reverberation, or the reverberation time. The parameters may be predetermined fixed values, or variables that are determined depending on the distance and the direction of the virtual sound source. There, under otherwise equal parameters, the delay of the dry signal is larger at a larger distance. Applying a distance-dependent gain and spectral modification on the input audio object signal mimics the lower volume perceived from a more distant source, and the spectral absorption in air. In particular, the spectral modification may comprise a low-pass filter to reduce the intensity of higher spectral components, which are more strongly attenuated in air. For example, the first dry signal may be a single-channel signal, wherein the delay, gain, and spectral modification are applied identically for all speakers. Alternatively, the delay, gain, and spectral modification may be applied differently for each speaker, so that the first dry signal is a multi-channel signal.

Determining the second dry signal and the artificial reverberation signal separately and in parallel allows generating a realistic representation of a far signal taking into account the delay between the dry and reverb signals, while at the same time reducing the number of computational steps. In particular, the relative differences in delay and gain are produced by applying the corresponding transformations only to the dry signal, thereby limiting the complexity of the method.

In an embodiment, a common spectral modification is applied to adapt the input audio object signal to the frequency range generable by all speakers.

This adapts the signal to speakers of different characteristics. In particular, small speakers that are mountable to a headrest may support the most limited spectrum, for example, the smallest bandwidth, or exhibit other spectral distortions that prevent playing the entire spectral range of an input signal. Speaker's spectra may not fully overlap, such that a limited range of frequency components is generable by all speakers.

Spectrally modifying the signal identically for all channels allows keeping the spectral color constant over all speakers, and the output sounds essentially the same when coming from a different simulated direction.

In a further embodiment, the common spectral modification comprises a band-pass filter. Preferably, a bandwidth of the band-pass filter corresponds to the speaker with the smallest frequency range.

Limiting the bandwidth of the input audio object signal, identically for all channels, to the smallest bandwidth of all the speakers allows adapting for use with a variety of speakers with different characteristics, while the spectral width of the output is independent of the speaker.

In a further embodiment, the method comprises applying a spectral speaker adaptation and/or a time-dependent gain on a signal on at least one channel. The channel is output by a height speaker.

A height speaker is a device or arrangement of devices that sends sound waves toward the listener position from a point above the listener position. The height speaker may comprise a single speaker positioned higher than the listener location, or a system comprising a speaker and a reflecting wall that generates and redirects a sound wave to generate the appearance of the sound coming from above. The time-dependent gain may comprise a fading-in effect, where the gain of a signal is increased over time. This reduces the impression by the listener that the sound is coming from above. A sound source location can thus be placed above a place that is obstructed or otherwise unavailable for placing a speaker, and the sound nonetheless appears to come from that place. This creates the impression of sound coming from a position substantially at the same height as the listener, although the speaker is not in that position. In an illustrative example, in a vehicle, most speakers may be installed at the height of the listener's (e. g. driver's) ears, e. g. in the A pillars, B pillars and headrests. Additional height speakers above the side windows generate sound coming from the sides.

In yet another embodiment, the method further comprises the following steps:

A sub-range of the spectral range of the input audio object signal is determined.

By one or more main speakers that are positioned closer to the listener position than the remaining speakers, a main playback signal is output. The main playback signal includes the frequency components of the input audio object signal that correspond to the sub-range.

The frequency components of the second dry signal that correspond to the sub-range are discarded.

These aspects enable setting the volume of the main playback speakers to a lower value than the remaining speakers. This allows a user at the listener position to hear the entire signal, whereas at any other position, the main playback signal is perceivable at a much lower volume, because the main playback signal is coming from the main speakers. For example, a user sitting in a seat at the listener position will hear essentially the full sound signal with both components. The user will perceive the directional cues from the multichannel audio signal. By contrast, at any other position, the volume of the main playback signal is lower, and anyone situated at these positions is prevented from hearing the entire signal. Thereby, people in the surroundings (such as passengers in a vehicle) are less disturbed by the acoustic signals. Also, privacy of the signal is obtained. By receiving an input indicating the sub-range, a tradeoff between a high degree of privacy at the expense of the amount of directional cue (a large sub-range used for the main playback signal, the remainder may be used for the multichannel audio signal), and a limited degree of privacy but a higher relative intensity of the signal comprising directional cues (a smaller sub-range used for the main playback signal, and a larger reminder used for the multichannel audio signal).

Optionally, the gain of the main playback signal may be adjusted so that the relative intensities of the main playback signal and the multichannel audio signal correspond to the relative intensities of the spectral range of the input audio signal and the remainder of the input audio signal. Thereby, the relative spectral intensities can be preserved, but the directional cues comprised in the multichannel signal and the reverb are included.

In a further embodiment, the sub-range comprises all spectral components of the input audio object signal below a predetermined cutoff frequency.

Thereby, the high frequencies are used by the plurality of speakers to generate the directional cues. Therefore, not all the speakers need to be broadband speakers. For example, all speakers except the main speakers can be small high-frequency speakers, e. g. tweeters, or more miniaturized speakers.

The cutoff may comprise a predetermined fixed value, which can be set depending on the types of speakers. Alternatively, the cutoff may be an adjustable value received as a user input. This allows setting a desired tradeoff between privacy and the amount of directional cues. A higher cutoff, for example, 80% of the frequency range in the main signal, leads to higher privacy at the expense of directional cues, because most of the acoustic signal is played by the main speakers close to the user's ears. A lower cutoff leads to less privacy, but more clearly audible directionality, as a larger portion of the signal is played by the main speakers.

In a further embodiment, determining a cutoff frequency comprises:

determining a spectral range of the input audio object signal, and calculating the cutoff frequency as an absolute cutoff frequency of a predetermined relative cutoff frequency relative to the spectral range.

Thereby, the cutoff frequency is adapted to each input audio object signal, which is advantageous if a plurality of input audio object signals with different spectral ranges are played, for example, high-frequency and low-frequency alarm sounds. In that case, equally wide spectral portions are used for main audio signal and directional cues, respectively. This avoids losing the entire signal for the directional cues (as would be the case for a low-frequency signal), or for the main signal (as would be the case for a high-frequency signal).

In a further embodiment, the main speakers are comprised in or attached to a headrest of a seat in proximity to the listener position.

By including the main speakers in a headrest, this condition allows the sound to reach within close proximity to the listener's ears. As the listener's head is leaning against the headrest, the listener position relative to the speaker positions can be determined at a few centimeters precision. This aspect may provide an accurate determination of the signals. The headrests are close to the listener's ears, so that the speaker output of the main playback signal may be played at a substantially lower volume than the high-frequency components. Thereby, the signal is less audible to anyone outside the listener position. For example, the full signal may be audible to a driver of the vehicle if the driver seat is the listener position. Passengers may not perceive the full signal.

In a further embodiment, the method comprises outputting, by the main speakers, a mix, in particular a sum, of the main playback signal and the multichannel audio signal. Thereby, the main speakers are used to output both the main signal and directional cues. Thereby, the total number of speakers may be reduced.

In yet another embodiment, the method further comprises transforming the signal to be output by the main speakers by a head-related transfer function (HRTF) of a virtual source location at a greater distance to the listener position than the position of the main speakers.

The HRTF may either be a generic HRTF or a personalized HRTF that is specially adapted to a particular user. For example, the method may further comprise determining an identity of the user at the listener position and determining a user-specific HRTF for the identified user.

Thereby, the acoustic signal at the listener position is perceived as if the acoustic signal was created at a virtual source position further away from the listener position, although the real source position is close to the listener position. For example, the virtual source may be at substantially the same distance to the listener position as the remaining speakers. Both generic and personalized HRTF may be used. Using a generic HRTF allows simpler usage without identifying the user, whereas a personalized HRTF creates a better impression of the source actually being the virtual source.

In yet another embodiment, the method further comprises transforming, by cross-talk cancellation, the signal to be output by the main speakers into a binaural main playback signal. In this embodiment, outputting the main playback signal comprises outputting the binaural main playback signal by at least two main speakers comprised in the plurality of speakers.

In yet another embodiment, the method further comprises panning the artificial reverberation signal to the locations of the plurality of speakers. This makes the sound output more similar to the sound generated by an object at the virtual source, since the reverb is also panned to the locations of the speakers. Thereby, the gain of the reverb can be increased in channels for the speakers in the direction of the virtual source. Optionally, a spectral modification may be applied to the reverberation signal to take into account also the absorption of the reflections in air. In particular, the spectral modification may be stronger in the channels for the speakers opposed to the source, to mimic the absorption of sound that has traveled a longer distance due to reflections.

This step takes into account that the audio output is calculated for a single ear. The audio output being sent to the ears by speakers rather than headphones, the left ear of a user can hear the signal that is supposed to be perceived by the right ear, and vice versa. Cross-talk cancellation modifies the signals for the speakers such that these effects are limited.

Another embodiment relates to a method for audio processing that comprises the following steps:

- A plurality of input audio objects is received.
- Each of the input audio objects is processed according to the steps of any of the above embodiments.
- Generating an artificial reverberation signal comprises the following:
  - For each input audio object, an adjusted signal is generated by modifying a gain for the input audio object signal depending on the corresponding distance;
  - A sum of the adjusted signals is calculated.
  - The sum is processed by a single-channel reverberation generator to generate the artificial reverberation signal.

Thereby, the different distances and corresponding changes in volume are taken into account by the step of adjusting the gain. However, the step of generating the artificial reverberation signal may be carried out once to reduce the needed amount of computational resources.

In a further embodiment, the plurality of speakers are comprised in or attached to a vehicle. In that embodiment, the input audio object may preferably indicate one or more of:

- a navigation prompt,
- a distance and/or direction between the vehicle and an object outside the vehicle,
- a warning related to a blind spot around the vehicle,
- a warning of a risk of collision of the vehicle with an object outside the vehicle, and/or
- a status indication of a device attached to or comprised in the vehicle.

Thereby, even different signals can be acoustically communicated to the driver of the vehicle. For example, a navigation prompt comprising an indication to turn right in 200 meters can be played such that it appears to come from the front right. A distance between the vehicle and an object outside the vehicle, such as a parked car, pedestrian, or other obstacle can be played with a virtual source location that matches the real source location. A status indication, such as a warning sound indicating that a component is malfunctioning, can be played with the appearance of coming from the direction of the component. This may, for example, comprise a seatbelt warning.

A second aspect of the present disclosure relates to an apparatus for creating a multichannel audio signal. The apparatus performing the method of any of the preceding claims. All properties of the first aspect also apply to the second aspect.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION

Figure 1:
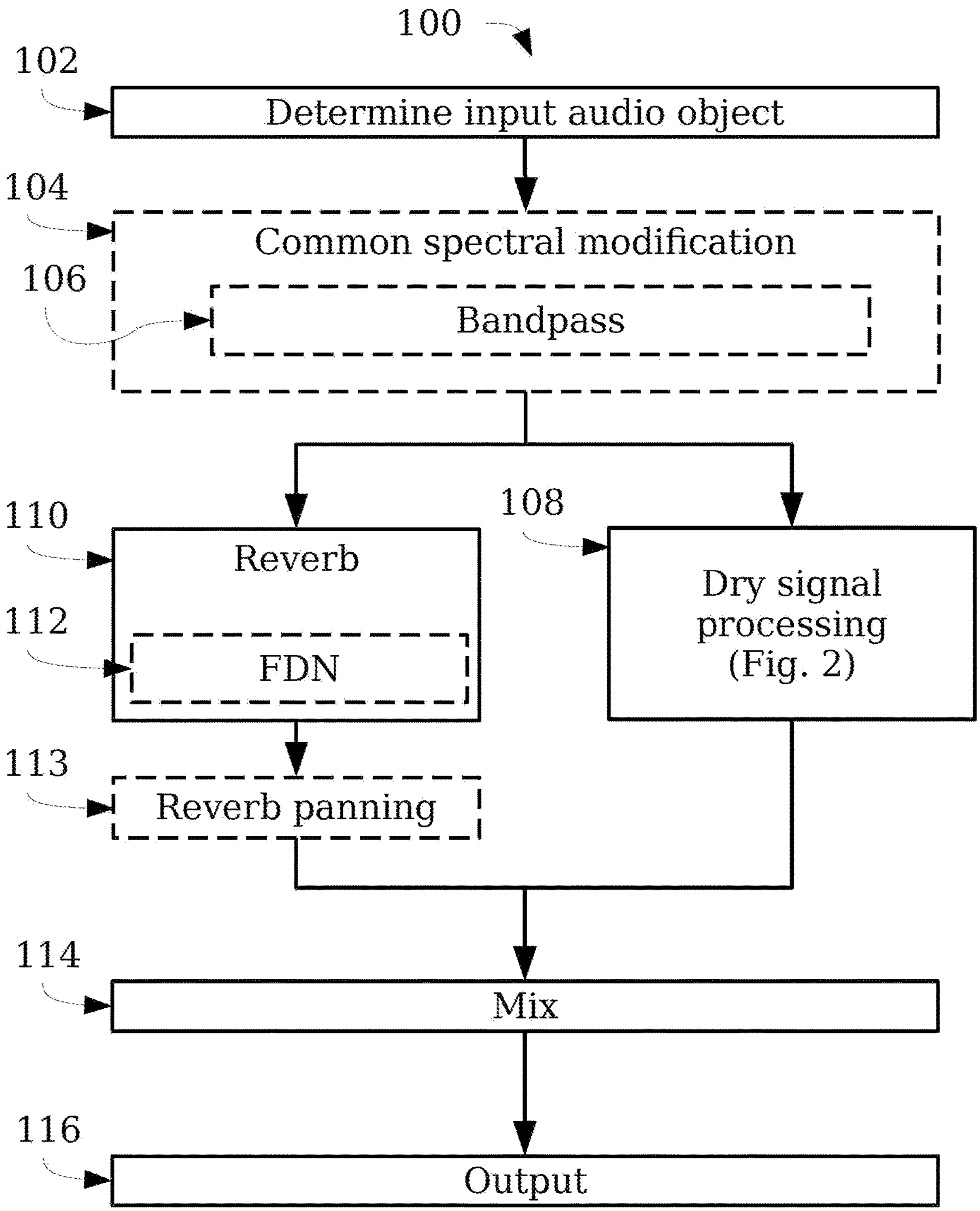
FIG. 1 shows a flow chart of a method according to an embodiment.

FIG. 1 shows a flow chart of a method 100 according to an embodiment. The method 100 begins by determining, 102, at least one input audio object, which may comprise receiving the input audio object from a navigation system or other computing device, producing or reading the input audio object from a storage medium. Optionally, a common spectral modification is applied, 104, to the input audio object signal. It is referred to as common in the sense that its effect is common to all output channels, and it may comprise applying a band-pass filter, 106. The common spectral modification leads to the signal being limited to the spectral range generable by all speakers. A spectra for a speaker may not fully overlap, such that a limited range of frequency components is generable by all speakers. The generable range may be predetermined and stored in a memory for each speaker.

The signal is then split and processed, on the one hand, by one or more dry signal operations 108 and panning 116, and on the other hand, by generating an artificial reverberation signal 124.

The dry signal processing steps are described with respect to FIG. 2 below.

In parallel to this, the input audio object signal is transformed into an artificial reverberation signal, 110, based on predetermined room characteristics. For example, as a room characteristic, a reverberation time constant may be provided. The artificial reverberation signal is then generated to decay in time such that the signal decays to, for example, 1/e, according to the reverberation time constant. If, for example, the method 100 is to be used to generate spatialized sound in a vehicle, then the reverberation parameters may be adapted to the vehicle interior. Alternatively, more sophisticated room characteristics may be provided, including a plurality of decay times. Transforming into an artificial reverberation signal may comprise the usage of a feedback delay network (FDN) 112, as opposed to, for example, a convolutional reverberation generator. Implementing the generation of artificial reverberation by the FDN 112 allows flexibly adjusting the reverberation for different room sizes and types. Furthermore, the FDN 112 uses processing power efficiently. Using the FDN 112 allows implementing non-static behavior. The reverberation is preferably applied once on the input audio object signal and then equally mixed into the channels at the output as set out below, i.e., the reverberation signal is preferably a single-channel signal. In an optional step 113, the single-channel signal can be panned over some or all of the speakers. This can make the rendering more realistic. All features related to the dry signal panning are applicable to panning the reverb signal. Alternatively, this step is omitted and panning may be applied to the dry signal, in order to reduce the computing workload.

To produce a multichannel audio signal, the second dry signal and the artificial reverberation signal are mixed, 114, so that the multichannel audio signal is a combination of both. For example, a sum of both signals may be produced. Also, more complicated combinations are possible. For example, a weighted sum or a non-linear function that takes the second dry signal and the artificial reverberation signal as an input may be utilized.

Outputting, 116 the multichannel audio signal via the speakers then generates an acoustic output signal that creates the impression to a listener at the listener position that the signal is coming from the input audio object location.

Determining the second dry signal and the artificial reverberation signal separately and in parallel allows generating a realistic representation of a far signal, while at the same time reducing the number of computational steps. In particular, the relative differences in delay and gain are produced by applying the corresponding transformations to the dry signal, thereby limiting the complexity of the method 100.

Figure 2:
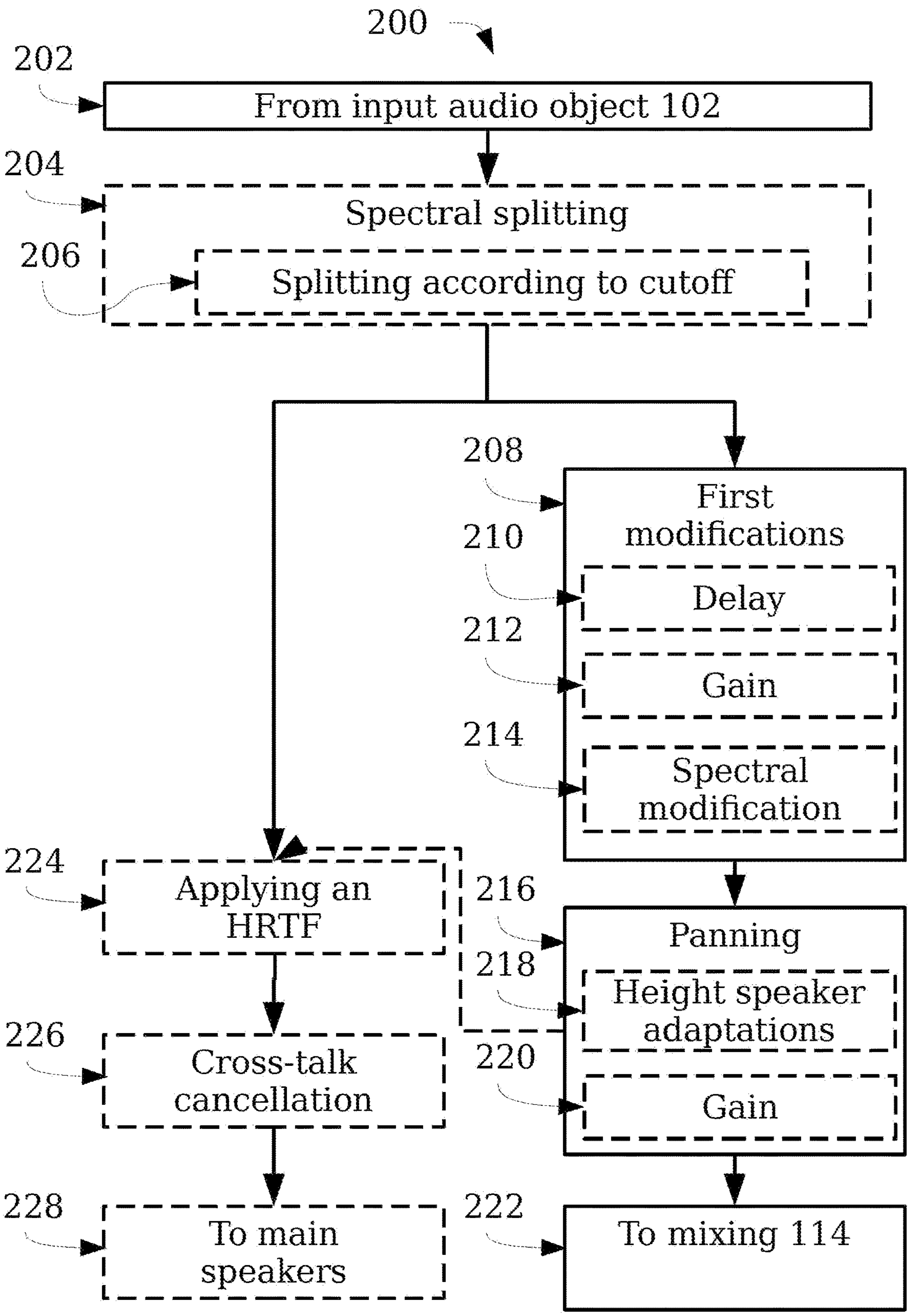
FIG. 2 shows a flow chart of a method for dry signal processing according to an embodiment.

FIG. 2 shows a flow chart of a method 200 for dry signal processing according to an embodiment.

In optional steps 204 and 206, the signal is split 204 into two frequency components. The frequency components are preferably complementary, i.e., each frequency component covers its spectral range, and the spectral ranges together cover the entire spectral range of the input audio object signal. In a further exemplary embodiment, splitting the signal comprises determining a cutoff frequency and splitting the signal into a low-frequency component covering all frequencies below the cutoff frequency, and a high-frequency component covering the remainder of the spectrum.

Preferably, the low-frequency component is processed as a main audio playback signal, and the high-frequency component is processed as a dry signal. This entails that these high-frequency components are used for giving a directional cue to the listener. By contrast, the low-frequency components are represented in the main playback signal played by the main speakers, which are closer to the listener position. The gain is adjusted so that the full sound signal arrives at the listener position. For example, a user sitting in a chair at the listener position, will hear essentially the full sound signal with both high-frequency and low-frequency components. The user will perceive the directional cues from the high-frequency component. By contrast, at any other position, the volume of the low-frequency component is lower, and anyone situated at these positions is prevented from hearing the entire signal. Thereby, users in the surroundings, such as passengers in a vehicle, are less disturbed by the acoustic signals. Also, a certain privacy of the signal is obtained. Use of the high-frequency allows using smaller speakers for the spatial cues.

Alternatively, the input audio object signal (after optional common spectral modification) is copied to create two replicas, and the above splitting process is replaced by applying high-pass, low-pass, or band-pass filters after finishing the other processing steps.

The main audio playback signal may optionally be further processed by applying, 224, a head-related transfer function (HRTF). The HRTF, a technique of binaural rendering, transforms the spectrum of the signal such that the signal appears to come from a virtual source that is further away from the listener position than the main speaker position. This reduces the impression of the main signal coming from a source that is close to the ears. The HRTF may be a personalized HRTF. In this case, a user at the listener position is identified and a personalized HRTF is selected. Alternatively, a generic HRTF may be used to simplify the processing. In case two or more main speakers are used, a plurality of main audio playback channels is generated, each of which is related to a main speaker. The HRTF is then generated for each main speaker.

If two or more main speakers are used, it is preferable to apply, 226, cross-talk cancellation. This includes processing each main audio playback channel such that the component reaching the more distant ear is less perceivable. In combination with the application of the HRTF, this allows the use of main speakers that are close to the listener position, so that the main signal is at a high volume at the listener position and at s lower volume elsewhere, and at the same time has a spectrum similar to that of a signal coming from further away.

It should be noted that steps 225 and 226 are optional. In a simplified embodiment, no main audio signal may be created, and no main speakers may be used. Rather, first dry signal processing and panning are applied to an unfiltered signal.

The single-channel modifications 208 comprise one or more of a delay 210, a gain 212, and a spectral modification 214. Applying, 210, a distance-dependent delay on the input audio object signal allows adjusting the relative timing of reverberation and dry signals to the delay observed in a simulated room having the predetermined room characteristics. There, under otherwise equal parameters, the delay of the dry signal is larger at a larger distance. The gain simulates lower volume of the sound due to the increased distance, for example, by a power law. The spectral modification 214 accounts for attenuation of sound in air. The distance-dependent spectral modification 214 preferably comprises a low-pass filter that simulates absorption of sound waves in air. Such absorption is stronger for high frequencies.

Panning, 216, the first dry signal to the speaker locations generates a multichannel signal, wherein one channel is generated for each speaker, and for each channel, the amplitude is set such that the apparent source of the sound is at a speaker or between two speakers. For example, if the input audio object location, seen from the listener location, is situated between two speakers, the multichannel audio signal is non-zero for these two speakers, and the relative volumes of these speakers are determined using the tangent law. This approach may further be modified by applying a multichannel gain control, i. e. multiplying the signals at each of the channels with a predefined factor. This factor can take into account specifics of the individual speaker, and of the arrangement of the speakers and other objects in the room.

The optional path from block 216 to block 224 relates to the optional feature that the main speakers are used both for main playback and for playback of the directional cues. In this case, the main speakers are accorded a channel each, in the multichannel output, and the main speakers are each configured to output an overlay, e. g. a sum, of main and directional cue signal. For example, their low-frequency output may comprise the main signal, and their high-frequency output may comprise a part of the directional cues.

Optionally, speakers may comprise height speakers. For example, the height speakers may comprise speakers that are installed above the height of the listener position, so as to be above a listener's head. For example, in a vehicle, the height speakers may be located above the side windows. The signal may be spectrally adapted, 218, to have high frequencies in the signal. The signal may also subject to a time-dependent gain, in particular increasing gain, such as a fading-in effect. These steps make the fact less obvious for a listener that the speakers are indeed above head's height.

In order to account for specifics of the room, the gain of each speaker may optionally be adapted, 220. For example, objects, such as seats, in front of a speaker, attenuate the sound generated by the speaker. In this case, the volume of the speakers should be relatively higher than that of the other speakers. This optional adaptation may comprise applying predetermined values but may also change as room characteristics change. For example, in a vehicle, the gain may be modified in response to a passenger being detected as sitting on a passenger seat, a seat position being changed, or a window being opened. In these cases, speakers for which a relatively minor part of the acoustic output reaches the listener position are subjected to increased gain.

The signal is then sent to step 114, where the signal is mixed with the main signal.

Figure 3:
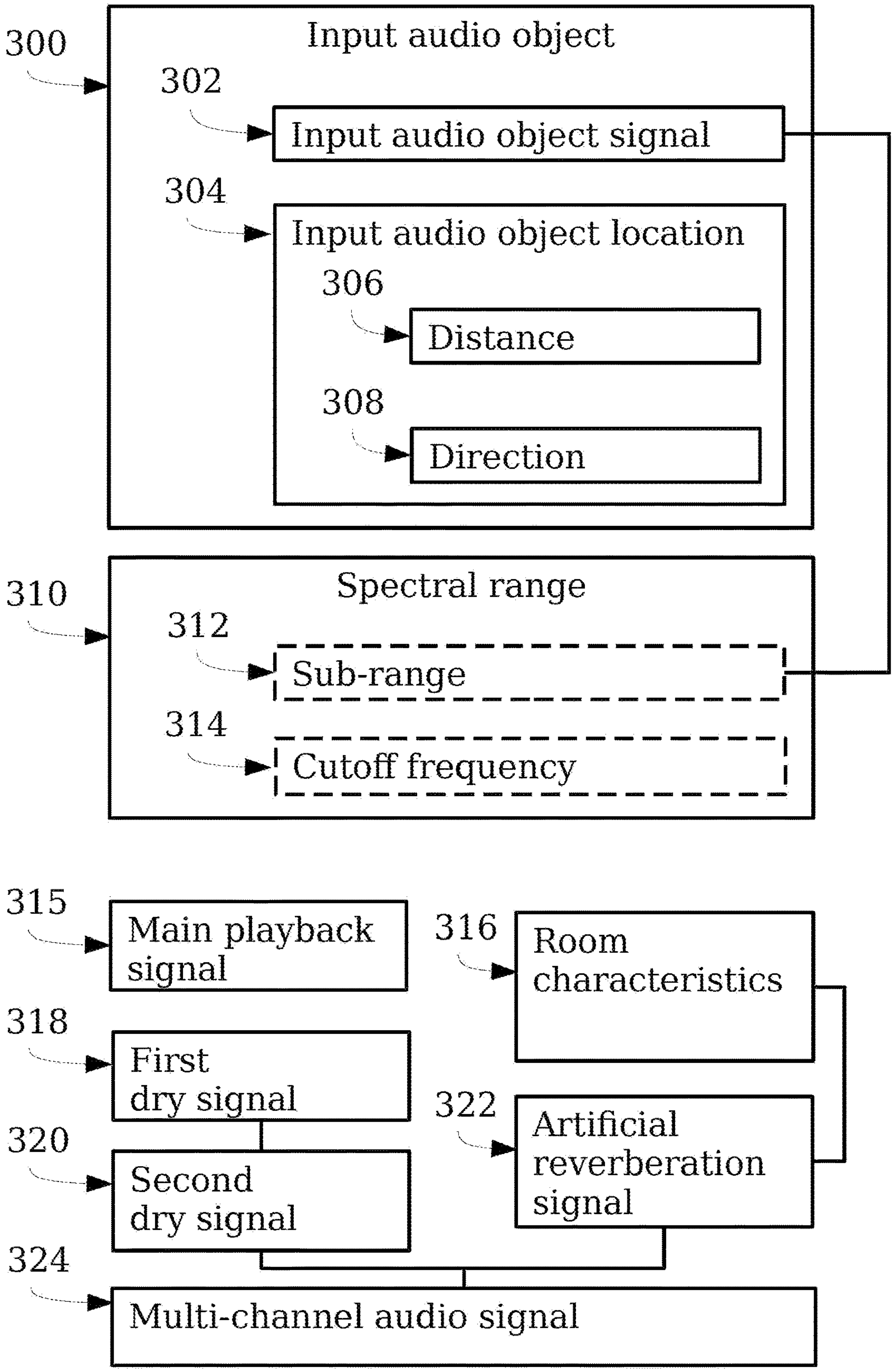
FIG. 3 shows a block diagram of data structures according to an embodiment.

FIG. 3 shows a block diagram of data structures according to an embodiment.

The input audio object 300 comprises information on the type of audio that is to be played (input audio object signal 302), which may comprise any kind of audio signal, such as a warning sound, a voice, or music. It can be received in any format but preferably the signal is included in a digital audio file or digital audio stream. The input audio object 300 further comprises an input audio object location 304, defined as distance 306 and direction 308 relative to the listener location. Execution of the method thereby permits rendering and playing the input audio object signal 302 such that a listener, located at the listener position, is able to hear the sound and have the appearance that the sound is coming from the input audio object location 304. For example, if the input audio object 300 is to comprise an indication of a malfunctioning component, then a stored input audio object signal 302 comprises a warning tone and direction 308 and distance 306 from the expected position of a head of a driver sitting on a driver's seat. Alternatively, when received from a collision warning system, the warning tone, direction 308, and distance 306 may represent a level of danger, direction and distance associated with an obstacle outside the vehicle. For example, a warning system may detect another vehicle on the road and generate a warning signal whose frequency depends on the relative velocities or type of vehicle, and direction 308 and distance 306 of the audio object location represent the actual direction and distance of the object.

The spectral range 310 of the input audio object signal covers all frequencies from the lowest to the highest frequency. It may be split into different components. In particular, a sub-range 312 may be defined, in order to use the main audio object signal at this sub-range, preferably after applying HRTF 224 and Cross-talk cancellation 226, as a main signal. A remaining part of the spectrum may be then used as a dry signal. In order to determine the sub-range 312, a cutoff frequency 314 may be determined, such that the sub-range covers the frequencies below the cutoff frequency 314.

The generation of the reverb signal is steered by using one or more room characteristics 316, such as a reverb time, the time and level of the early reflections, the level of the reverberation, or the reverberation time.

The input audio object signal or the part of its spectrum not comprised in the sub-range 312 is processed by single-channel modifications 208 to generate the first dry signal 318, which is in turn processed by panning, 216, to generate the second dry signal 320. The reverberation signal 322 is generated based on the room characteristics 316 and mixed together with the second dry signal 320 to obtain the multichannel audio signal 324.

Figure 4:
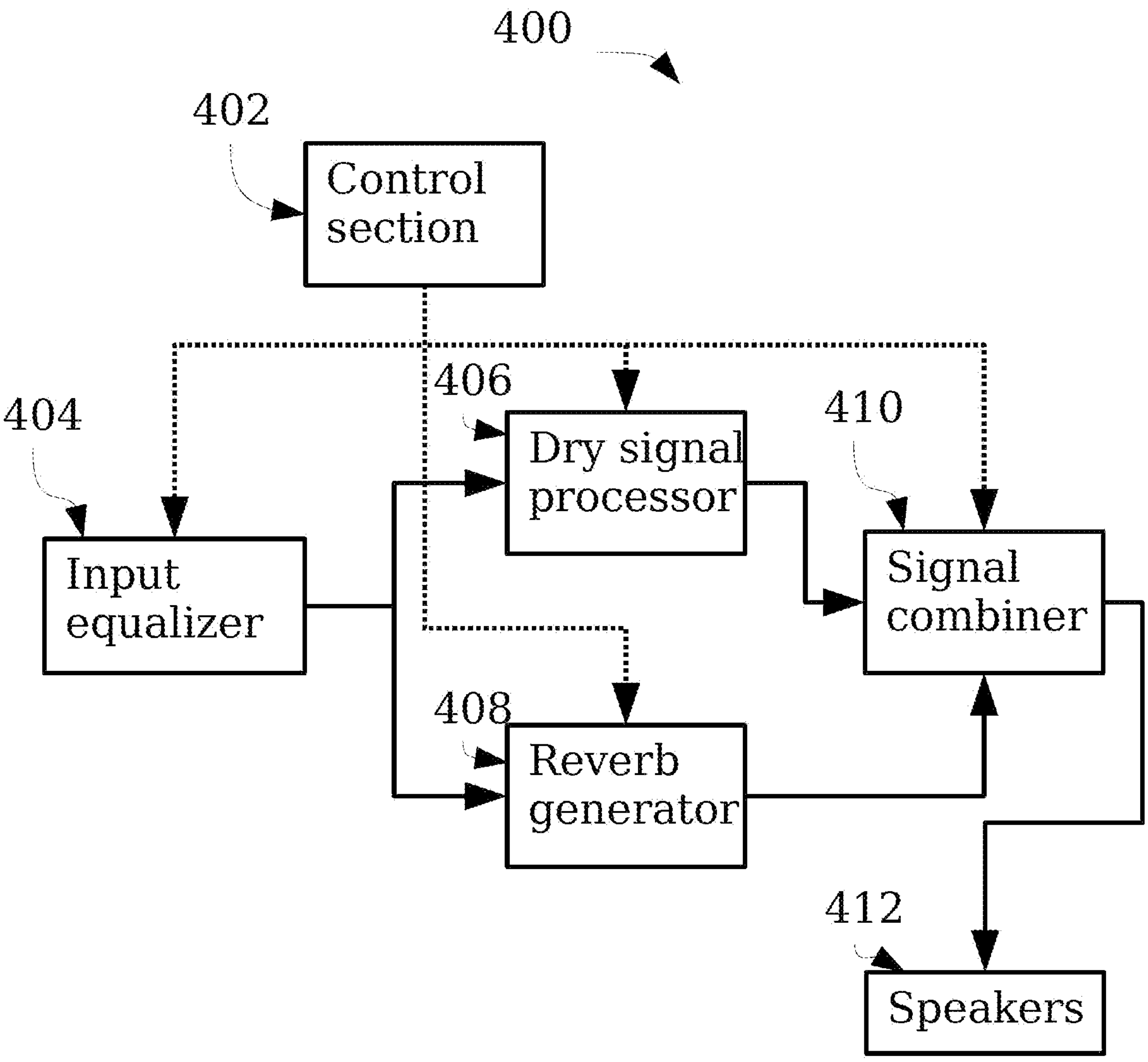
FIG. 4 shows a block diagram of a system according to an embodiment.

FIG. 4 shows a block diagram of a system according to an embodiment. The system 400 comprises a control section 402 configured to determine, 102, the input audio object and control the remaining components such that their operations depend on the input audio object location. The system 400 further comprises an input equalizer 404 configured to carry out the common spectral modification 104, in particular the band-pass filtering 106. The dry signal processor 406 is adapted to carry out the steps discussed with reference to FIG. 2. The reverb generator 408 is configured to determine, 110, a reverb, and may in particular by comprise a feedback delay network FDN 112. The signal combiner 410 is configured to mix, 114 the signals to generate a multichannel output for the speakers 412. Components 402-410 may be implemented in hardware or in software.

Figure 5:
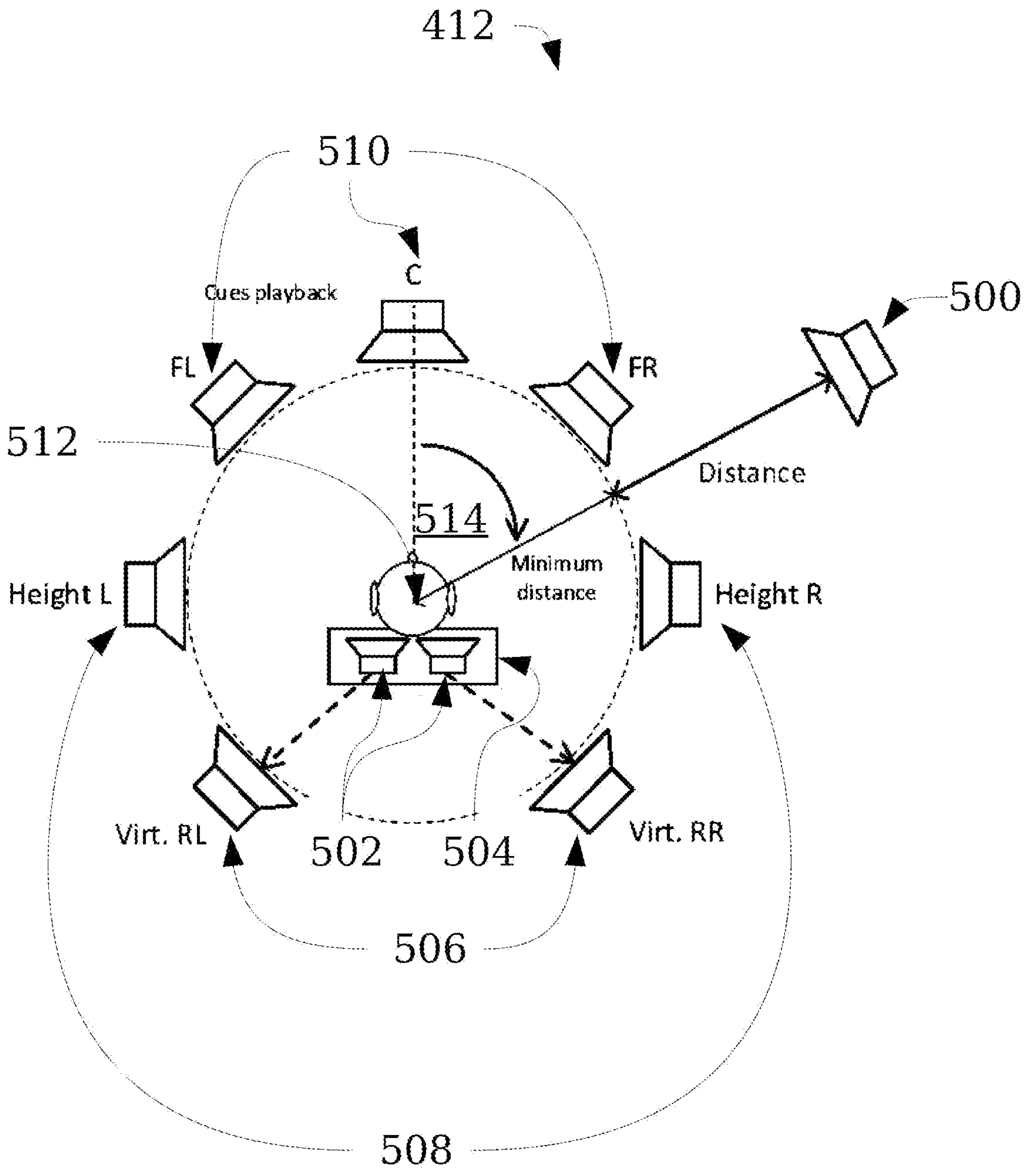
FIG. 5 shows a block diagram of a configuration of speakers according to an embodiment.

FIG. 5 shows a block diagram of a configuration of speakers 412 according to an embodiment.

The speakers 412 may be located substantially in a plane. In this case, the apparent source is confined to the plane, and the direction comprised on the input audio object can then be specified as a single parameter, for example, an angle 514. Alternatively, the speakers may be located three-dimensionally around the listener position 512, and the direction can then be specified by two parameters, for example, azimuthal and elevation angles.

In this embodiment, the speakers 412 comprise a pair of main speakers 502, in a headrest 504 of a seat (not shown), configured to output the multichannel audio signal 324, and thereby creating the impression that the main audio playback comes from virtual positions 506. The speakers 412 further comprise a plurality of cue speakers 510. In an illustrative example, in a vehicle, the cue speakers may be installed at the height of the listener's (driver's) ears, e. g. in the front dashboard and front A pillars. However, also other positions, such as B pillars, vehicle top, and doors are possible.

Additional height speakers 508 above the side windows generate sound coming from the sides. A height speaker is a device or arrangement of devices that sends sound waves toward the listener position from a point above the listener position. The height speaker may comprise a single speaker positioned higher the listener, or a system comprising a speaker and a reflecting wall that generates and redirects a sound wave to generate the appearance of the sound coming from above. The time-dependent gain may comprise a fading-in effect, where the gain of a signal is increased over time. This reduces the impression by the listener that the sound is coming from above. A sound source location can thus be placed above a place that is obstructed or otherwise unavailable placing a speaker, and the sound nonetheless appears to come from the that place. This creates the impression of sound coming from a position substantially on the same height as the listener, although the speaker is not in that position. In an illustrative example, in a vehicle, most speakers may be installed at the height of the listener's (driver's) ears, for example, in the A pillars, B pillars and headrests. Additional height speakers above the side windows generate sound coming from the sides.

Figure 6:
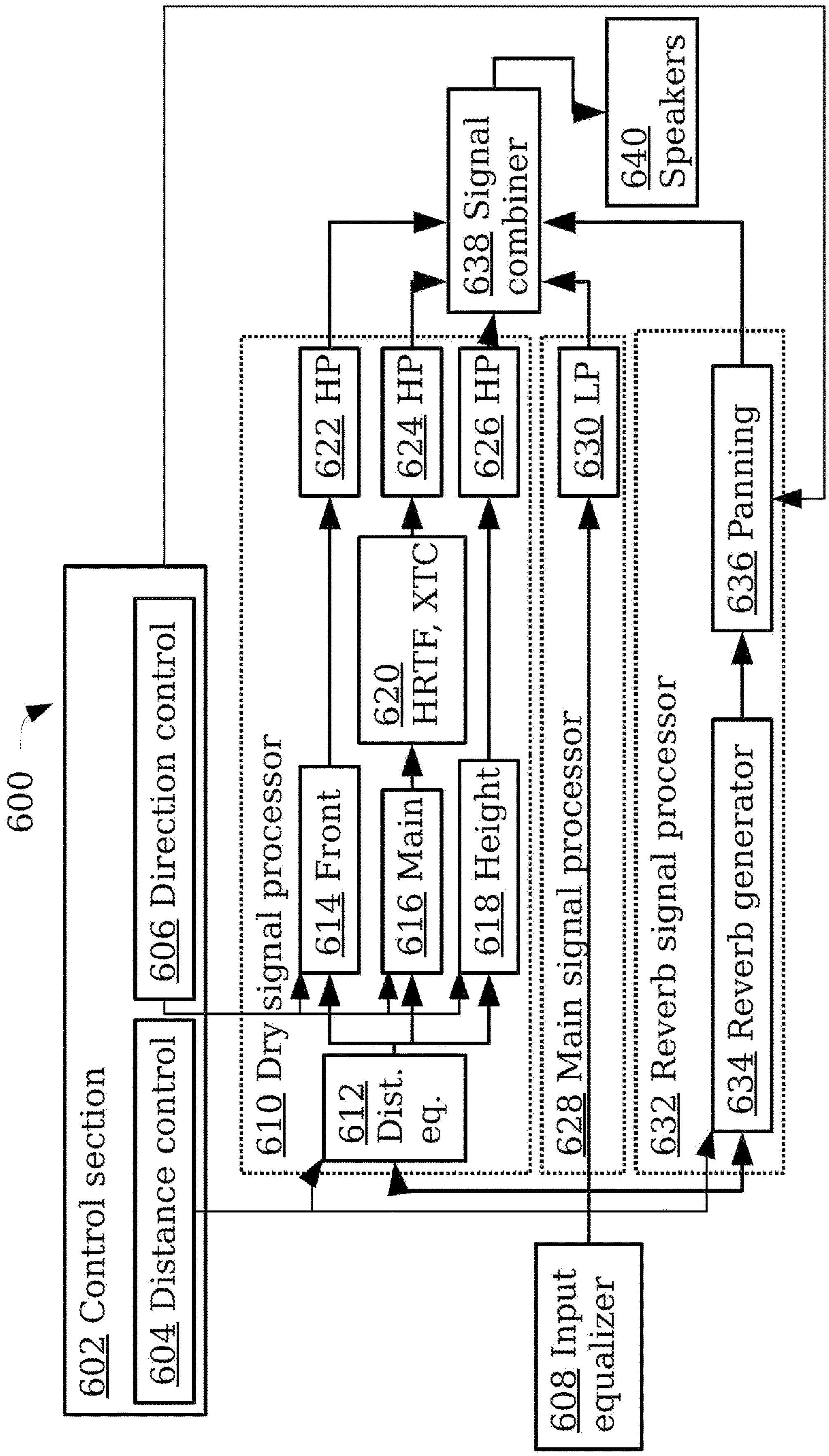
FIG. 6 shows a system according to a further embodiment

FIG. 6 shows a system 600 according to a further illustrative embodiment. The system comprises a control section 602 configured to control the other parts of the system. In particular, the control section 602 comprises a distance control unit 604 to generate a value of a distance as part of an input audio object location and a direction control unit 606 to generate a direction signal. In this figure, the thin lines refer to control signals, whereas the broad lines refer to audio signals.

The input equalizer 608 is configured to apply the common spectral modification 104 to adapt the input audio object signal to a frequency range generable by all speakers. The input equalizer may implement a band-pass filter.

The signal is then fed into a dry signal processor 610, a main signal processor 628, and a reverb signal processor 632.

The dry signal processor 610 comprises a distance equalizer 612 configured to apply a spectral modification that emulates sound absorption in air. The front speaker channel processor 614, main speaker channel processor 616, and a height speaker channel processor 618 process each replica of the spectrally modified signal and are each configured to pan the corresponding signal over the speakers, to apply gain corrections, and to apply delays. The parameters of these processes may be different for front, main, and height speakers. The signals for the main speakers, which are close to the listener position, are further processed by the HRTF and cross-talk cancelation 620, in order to create an impression of a signal originating from a more distant source. The three signals are then sent into high pass filters 622, 624, 626 so that the frequency cues are output by this part of the system.

The main signal processor 628 comprises a low pass filter 630 to create a main signal to be output by the main speakers. In other embodiments, the main signal processor may also comprise head-related transfer function and cross-talk cancelation sections, to create the impression that the main signal is coming from a more distant source.

The reverb signal processor 632 comprises a reverb generator 634, for example a feedback delay network, to generate a reverb signal based on its input. The reverb signal is then processed by additional reverb signal panning 636, to create the impression that the reverb is originated at the virtual source location. In different embodiments, additional optional steps may comprise application of spectral modifications to better simulate absorption of the reverb in air.

The signal combiner 638 mixes and sends the signals to the appropriate speakers 640. For example, the main speakers may receive a weighted sum the dry signals treated by the main speaker channel processing 616, the main signal filtered by the low-pass filter 630, and the reverb signal. The height speakers may receive a weighted sum of the dry signals treated by the height speaker channel processing 618 and the reverb signal. The other speakers are, in this embodiment, front speakers. They may receive a weighted sum of the dry signals treated by the front speaker channel processing 614 and the reverb signal.

REFERENCE SIGNS

100 Method for audio processing
102-116 Steps of method 100
200 Method for dry signal and main audio signal processing
202-228 Steps of method 100
300 Input audio object
302 Input audio object signal
304 Input audio object location
306 Distance to a listener location
308 Direction relative to a listener location
310 Spectral range
312 Sub-range of the main playback signal
314 Cutoff frequency
315 Main playback signal
316 Room characteristics
318 First dry signal
320 Second dry signal
322 Artificial reverberation signal
324 Multichannel audio signal
400 System
402 Control section
404 Input equalizer
406 Dry signal processor
408 Reverb generator
410 Signal combiner
412 Speakers
500 Virtual source
502 Main speakers
504 Headrest
506 Virtual source for main signal
508 Height speakers
510 Directional cue speakers
512 Listener position
514 Angle
600 System
602 Control section
604 Distance control
606 Direction control
608 Input equalizer
610 Dry signal processor
612 Distance equalizer
614 Front speaker channel processing
616 Main speaker channel processing
618 Height speaker channel processing
620 Head-related transfer function and Cross-talk cancelation
622 High pass filter for front speakers
624 High pass filter for front speakers
626 High pass filter for front speakers
628 Main signal processor
630 Low pass filter
632 Reverb signal processor
634 Reverb generator
636 Reverb signal panning
638 Signal combiner
640 Speakers

What is claimed is:

1. A method for audio processing, the method comprising:

determining at least one input audio object that includes an input audio object signal and an input audio object location, wherein the input audio object location includes a distance and a direction relative to a listener location;

depending on the distance, applying at least one of a delay, a gain, and a spectral modification to the input audio object signal to produce a first dry signal;

depending on the direction, panning the first dry signal to locations of a plurality of speakers around the listener location to produce a second dry signal;

depending on one or more predetermined room characteristics, generating an artificial reverberation signal from the input audio object signal;

mixing the second dry signal and the artificial reverberation signal to produce a multichannel audio signal; and outputting each channel of the multichannel audio signal by one of the plurality of speakers.

2. The method of claim 1, further comprising applying a common spectral modification to adapt the input audio object signal to a frequency range generable by all speakers.

3. The method of claim 2, wherein the common spectral modification comprises a band-pass filter.

4. The method of claim 1, further comprising applying at least one of a spectral speaker adaptation and a time-dependent gain on a signal of at least one channel, and outputting the at least one channel by at least a height speaker comprised in the plurality of speakers.

5. The method of claim 1, further comprising:

determining a sub-range of a spectral range of the input audio object signal;

outputting, by one or more main speakers that are closer to a listener position than remaining speakers, a main playback signal including frequency components of the input audio object signal that correspond to the sub-range; and discarding the frequency components of the second dry signal that correspond to the sub-range.

6. The method of claim 5, wherein the sub-range comprises a part of the spectral range of the input audio object signal below a predetermined cutoff frequency.

7. The method of claim 5, wherein determining a cutoff frequency comprises:

determining the spectral range of the input audio object signal, and calculating the cutoff frequency as an absolute cutoff frequency of a predetermined relative cutoff frequency relative to the spectral range.

8. The method of claim 5, wherein the main speakers are comprised in or attached to a headrest of a seat in proximity to the listener position.

9. The method of claim 5, further comprising outputting by the main speakers, a mix, in particular a sum, of the main playback signal and the multichannel audio signal.

10. The method of claim 5, further comprising transforming the multichannel audio signal to be output by the main speakers by a head-related transfer function of a virtual source location at a greater distance to the listener position than a position of the main speakers.

11. The method of claim 5, further comprising transforming, by cross-talk cancellation, the multichannel audio signal to be output by the main speakers into a binaural main playback signal, wherein outputting the main playback signal comprises outputting the binaural main playback signal by at least two main speakers comprised in the plurality of speakers.

12. The method of claim 1, further comprising panning the artificial reverberation signal to the locations of the plurality of speakers.

13. An apparatus for generating the multichannel audio signal based on the method of claim 1.

14. A method for audio processing, the method comprising:

receiving a plurality of input audio objects, and processing each of the plurality of input audio objects, generating an artificial reverberation signal by:

generating an adjusted signal, for each input audio object by modifying a gain for an input audio object signal depending on a corresponding distance;

determining a sum of the adjusted signals; and processing the sum by a single-channel reverberation generator to generate the artificial reverberation signal.

15. The method of claim 14, wherein the input audio object indicates one or more of:

a navigation prompt, a distance between a vehicle and an object outside the vehicle, a warning related to a blind spot around the vehicle, a warning of a risk of collision of the vehicle with an object outside the vehicle, and/or a status indication of a device attached to or comprised in the vehicle.

16. A method for audio processing, the method comprising:

determining at least one input audio object that includes an input audio object signal and an input audio object location, wherein the input audio object location includes a distance and a direction relative to a listener location;

depending on the distance, applying at least one of a delay, a gain, and a spectral modification to the input audio object signal to produce a first dry signal;

depending on the direction, panning the first dry signal to locations of a plurality of speakers to produce a second dry signal;

depending on one or more predetermined room characteristics, generating an artificial reverberation signal from the input audio object signal;

mixing the second dry signal and the artificial reverberation signal to produce a multichannel audio signal; and outputting each channel of the multichannel audio signal by one of the plurality of speakers.

17. The method of claim 16, further comprising applying a common spectral modification to adapt the input audio object signal to a frequency range generable by all speakers.

18. The method of claim 17, wherein the common spectral modification comprises a band-pass filter.

19. The method of claim 16, further comprising applying at least one of a spectral speaker adaptation and a time-dependent gain on a signal of at least one channel, and outputting the at least one channel by at least a height speaker comprised in the plurality of speakers.

20. The method of claim 16, further comprising:

determining a sub-range of a spectral range of the input audio object signal;

outputting, by one or more main speakers that are closer to a listener position than remaining speakers, a main playback signal including frequency components of the input audio object signal that correspond to the sub-range; and discarding the frequency components of the second dry signal that correspond to the sub-range.

* * * * *